April 23, 1963

R. R. ADAMS 3,086,573

MACHINE FOR UNITING ROD ENDS

Filed Jan. 19, 1959

INVENTOR.
RUDOLPH R. ADAMS
BY WATTS & EDGERTON
AH Edgerton
ATTORNEYS

INVENTOR.
RUDOLPH R. ADAMS
BY
WATTS & EDGERTON
AH Edgerton
ATTORNEYS

April 23, 1963   R. R. ADAMS   3,086,573
MACHINE FOR UNITING ROD ENDS
Filed Jan. 19, 1959   4 Sheets-Sheet 3

INVENTOR.
RUDOLPH R. ADAMS
BY WATTS & EDGERTON
ATTORNEYS

April 23, 1963 R. R. ADAMS 3,086,573
MACHINE FOR UNITING ROD ENDS
Filed Jan. 19, 1959 4 Sheets-Sheet 4

INVENTOR.
RUDOLPH R. ADAMS
BY
WATTS & EDGERTON
AH Edgerton
ATTORNEYS

_United States Patent Office_ 3,086,573
Patented Apr. 23, 1963

3,086,573
MACHINE FOR UNITING ROD ENDS
Rudolph R. Adams, 24453 Bagley Road, Berea, Ohio
Filed Jan. 19, 1959, Ser. No. 787,416
7 Claims. (Cl. 153—1)

This invention relates broadly to machines for uniting rods disposed in coaxial relation, and more specifically to a fluid operated press for crimping tubular sleeves on the abutting ends of a rectangular frame, such for example, as the border wire for a coil bed spring or box mattress.

The border wire in bed springs, cushions, and so forth, must necessarily be made of spring steel and capable of regaining its unstressed form after localized distortion, hence, butt welding, though used to some extent, has been abandoned due to the uncertainty and breakage of the welded joint.

The present invention contemplates a tubular sleeve telescopically engaged with the confronting ends of a pair of lineal rods or wires and deformatively crimped in place thereon.

A further object of the invention is to provide a fluid operated press having dies thereon which are formed to rupture the tube and deform the rod, and still maintain the assembled rods in axial alignment.

Another object of the invention is to provide a machine that will effect assembly and securement of the tubular sleeve in a period of time comparable with the time required to complete the welding operation.

Further objects of the invention are to provide a machine which will facilitate a connection of a pair of rods or wires with ease and dispatch, a machine which is accurate and uniform in operation, a machine which will afford a broad factor of safety of the tensile load to be borne by the coupling, and a machine which is small, compact and designed for high speed production.

Other objects and advantages more or less ancillary to the foregoing, and the manner in which all the various objects are realized, will appear in the following description, which considered in connection with the accompanying drawings, sets forth the preferred embodiment of the invention.

Referring to the drawings.

Figure 1:
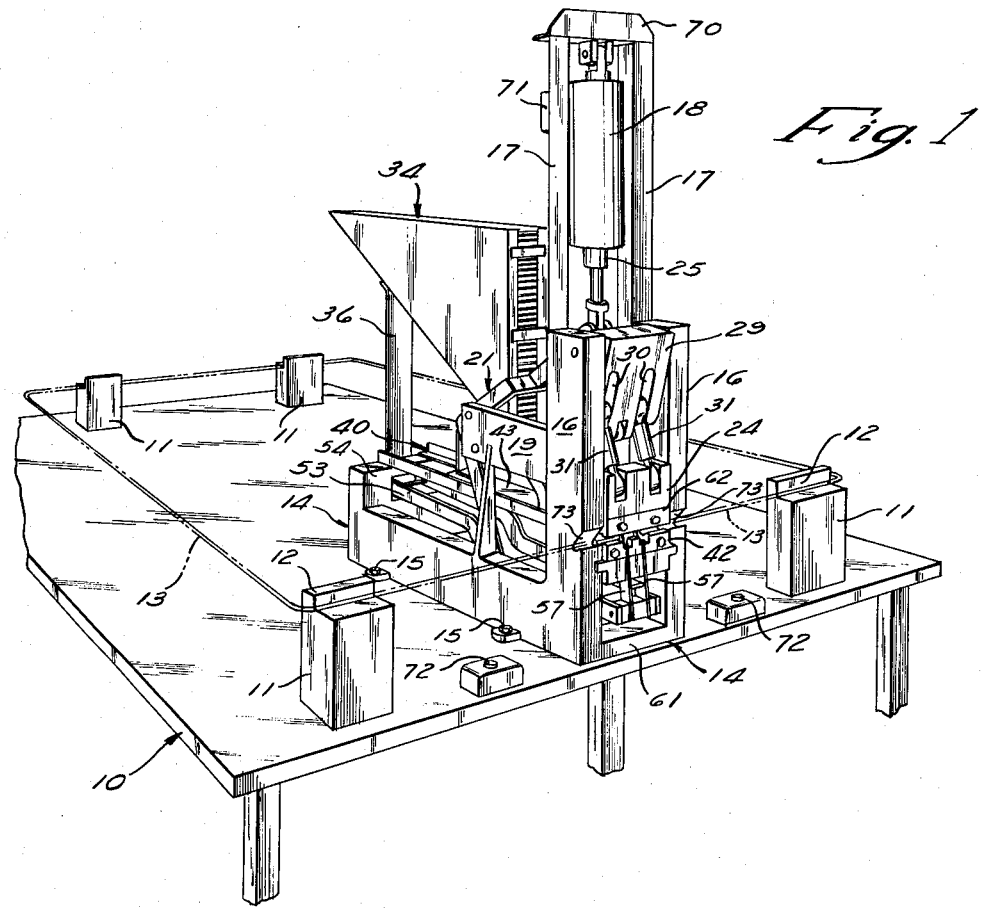
FIG. 1 is a view in perspective of the tubular sleeve crimping machine and associated parts.
Figure 2:
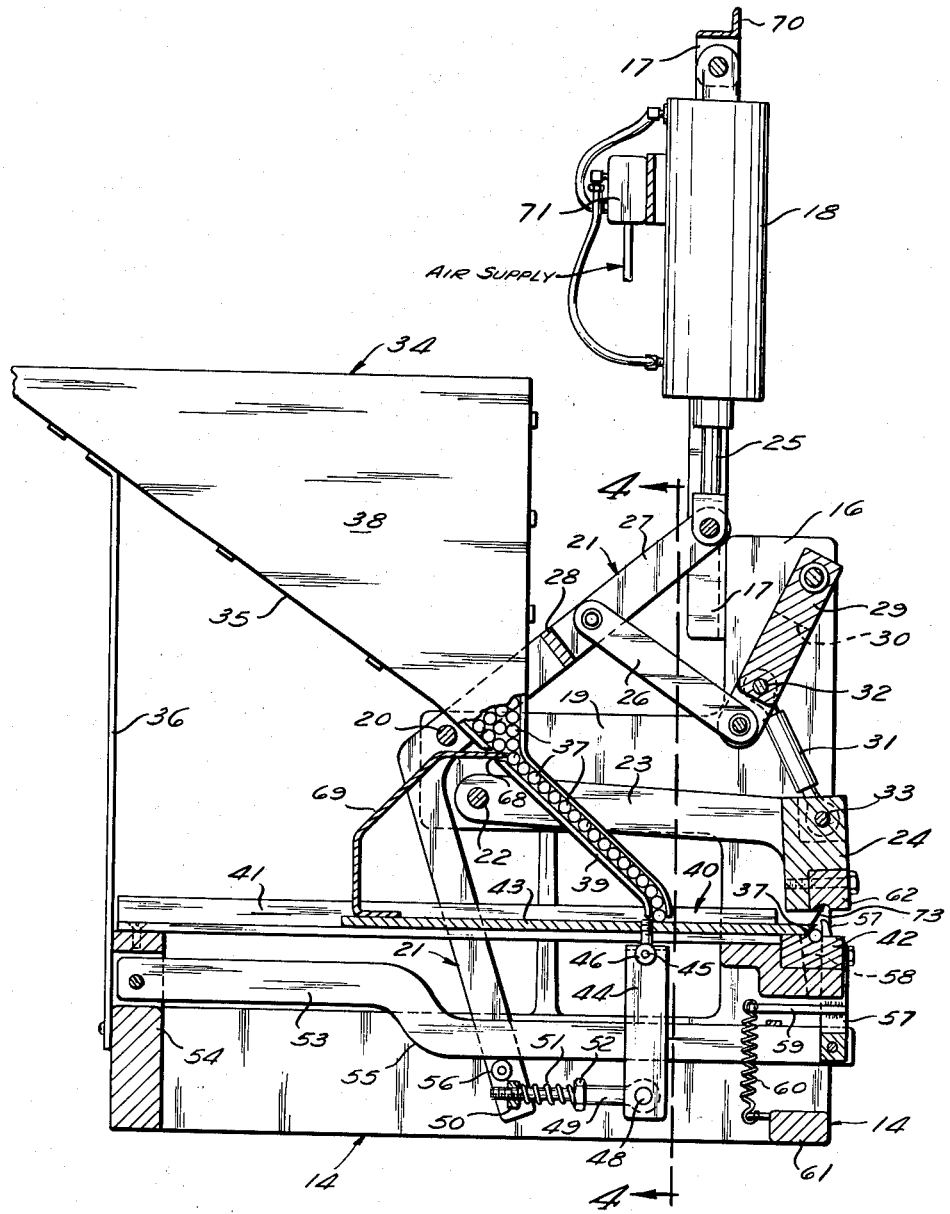
FIG. 2 is a vertical sectional view, shown with the dies therein, in their open position.
Figure 7:
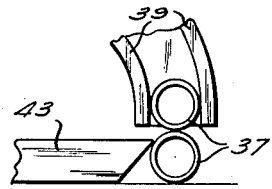
FIG. 7 is an enlarged detail view of the end of the sleeve chute and associated parts.
Figure 6:
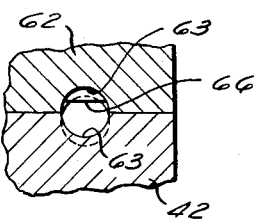
FIG. 6 is a cross section through the die blocks, the section being taken on a plane indicated by the line 6—6 in FIG. 5.

Referring first to FIG. 1, the machine embodying the present invention comprises a rectangular table or base 10 having blocks 11 on the corners thereof which are formed with shoulders 12 in their upper free ends for the retention of a bed spring or mattress frame 13. The press embodies a bed 14 secured to the table by bolts 15, a pair of spaced vertical columns 16 on the forward end thereof, and an auxiliary frame 17 protruding beyond the top thereof for the support of a fluid operated piston cylinder assembly 18. The rearward face of the central portion of the column 16 is formed with a pair of parallel horizontal arms 19 that support a rod 20 constituting the fulcrum for a bell crank 21 and a pin 22 for a pair of arms 23 pivoted thereon that carry the upper die block 24 (FIG. 2). The piston rod 25 is pivotally connected to the upper end of the bell crank 21, and a link 26 is pivoted on the upper arm 27 thereof adjacent the cross arm 28 of the yoke of the bell crank. The link 26 is fulcrumed in a block 29 pivoted between the inner sides of the columns 16. The block is provided with a pair of spaced parallel slots 30 for the support of the eyes of a pair of turn buckles 31 pivoted on a pin 32 in a cross-bore adjacent the lower end of the block. The eyes in the opposed ends of the turn buckles are pivoted on a pin 33 in a cross-bore in the top of the upper die block 24. A hopper 34 having a downwardly inclined base 35 is supported by a stanchion 36 secured to the bed 14 of the press. The width of the hopper is slightly greater than the length of the tubular sleeves 37 that are engaged with the spring border wire or frame 13. The sleeves are stacked in the hopper in parallel relation with each other and with the ends thereof adjacent the side walls 38 of the hopper. The lower end of the hopper is formed with a chute 39 proportioned so the sleeves will roll downwardly therein in single file and in a horizontal position. The end of the chute 39 is curved so the sleeves will fall from the terminating end thereof in normal relation to a guideway 40 formed of two paralell angle irons 41 secured to the bed 14 and aligned with the mating faces of the upper die block 24 and the lower die block 42. A plate 43 of a thickness less than the diameter of the sleeve is mounted for free sliding movement in the guideway 40, the leading edge thereof being beveled so the upper face of the plate is disposed above the horizontal center of the tubular sleeve (FIG. 7). The plate 43 has a yoke 44 subtended therefrom which is supported on an axle 45 for a pair of rollers 46 engaged with the lower faces of the angle irons 41. The yoke is secured to a stud 47 threaded in the plate and welded to the cross arm of the yoke. The lower ends of the yoke are drilled for a cross pin 48 for the pivotal support of a link 49 which is engaged in a threaded opening in a bar 50 swiveled on the lower end of the bell crank 21. The rearward portion of the link is threaded in the bar 50, and a spring 51 is retained thereon by a nut 52 and the face of the bar. A pair of arms 53 are pivotally mounted in a vertical web 54 in the rearward portion of the bed 14, the arms having an off-set cam surface 55 thereon rearward the depending yoke 44. The cam 55 is engaged by rollers 56 mounted on the inner faces of the yoke arms of the bell crank 21, and the forward ends of the arms of the yoke 53 are pivotally connected to a pair of fingers 57 guided in slots 58 in the die block arranged to kick the sleeve 37 and the wire frame 13 out of the lower die 42. Movement of the fingers 57 is controlled by arms 59 welded to the fingers intermediate their ends and interlinked with a spring 60 secured at its lower end to a cross rail 61 formed in the base of the bed 14.

The die block 42 is bolted to the bed 14 and the upper die 62 is secured to the die block 24, as will be seen in FIG. 2. Each die block is formed with mating semicircular grooves 63, the groove in the lower die block having an upwardly directed arcuate anvil 64 in the central portion thereof, and the upper die having a recess 65 congruent the anvil 64 with a pair of spaced sharp teeth 66 protruding downwardly and in vertical alignment with the point of intersection of the arcuate anvil 62 with the lineal end sections 67 in the die block. The longitudinal extent of the anvil is defined by a pair of spaced recesses, each of which is opposite and oriented with one of the spaced teeth 66. It will be seen that the recess 65 has a greater longitudinal extent than the anvil and that the recesses in the fixed die each have a greater longitudinal extent than the oppositely disposed and oriented tooth.

The hopper is formed with an aperature 68 in the rearward face thereof (FIG. 2) for the reception of a tongue 69 on a bracket carried by the plate 43. The bracket is positioned so the end of the tongue 69 will block all of the sleeves 37 in the hopper, save only those in a vertical column adjacent the forward face of the hopper (FIG. 2), and thus prevent jamming and blocking the throat of the chute 39.

The cylinder of the piston cylinder assembly 18 is pivotally mounted on a cross frame 70 (FIG. 1) on the top of the auxiliary frame 17 and compressed air is led thereto from a pump and accumulator reservoir (not shown) of any conventional form. The air supply is controlled by a solenoid valve 71 which is wired for actuation by the simultaneous operation of a pair of switch push buttons 72 on the forward edge of the table 10. The two switches are provided to safeguard the hands of the operator.

The forward face of the columns 16 of the press are formed with notches 73 therein disposed to support the wire frame 13 in axial alignment with the center line of the sleeves 60 in the lower die block 42. The shouldered blocks 11 are arranged so the corners of the rectangular frame 13 will be held equidistant the free ends of the wire with the sleeve 37 mounted thereon.

In operation, the piston in the press, as shown in FIG. 2, is positioned at the top of its upper stroke, the plate 43 having advanced a sleeve 37 into the die groove in the bottom die 42. The upper die 62 is elevated at this time by the linkage 21, 26, 29, 31 and the arms 23. In the following cycle of the machine, the upper ends of the fingers 57 are held against a sleeve 37 in the lower die block 42.

Figure 3:
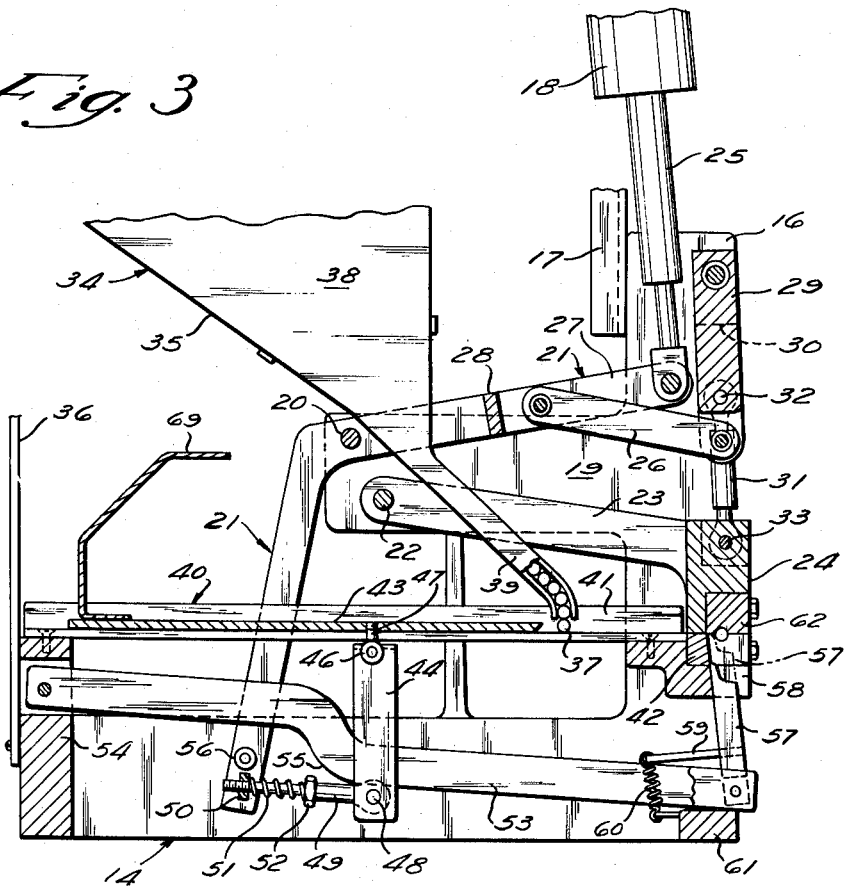
FIG. 3 is a vertical sectional view of a fragmentary portion of the machine shown in FIG. 2, with the dies therein, shown in their actuated position.
Figure 5:
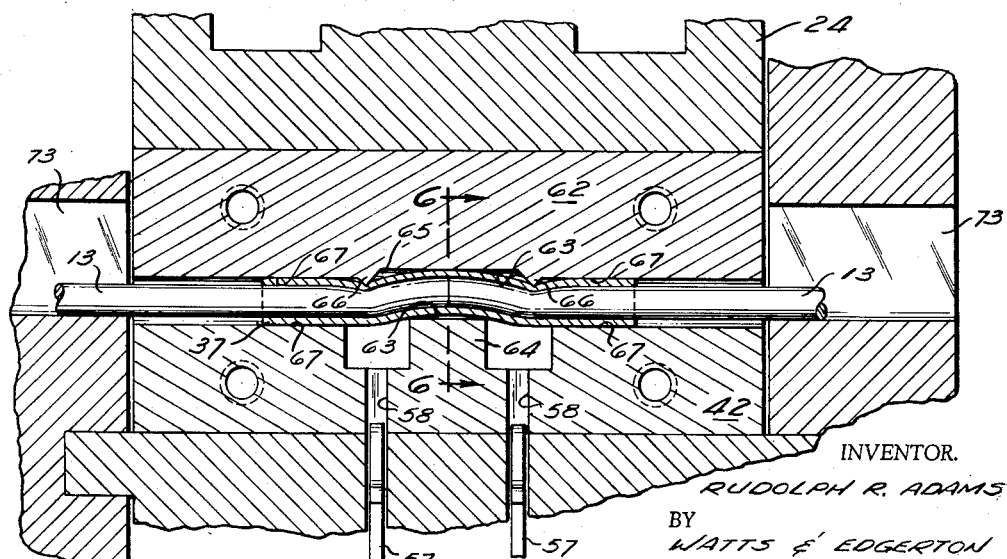
FIG. 5 is a vertical sectional view through the die blocks illustrated in FIGS. 2 and 3, and further illustrating the form of the rods and sleeve when the dies are closed.
Figure 4:
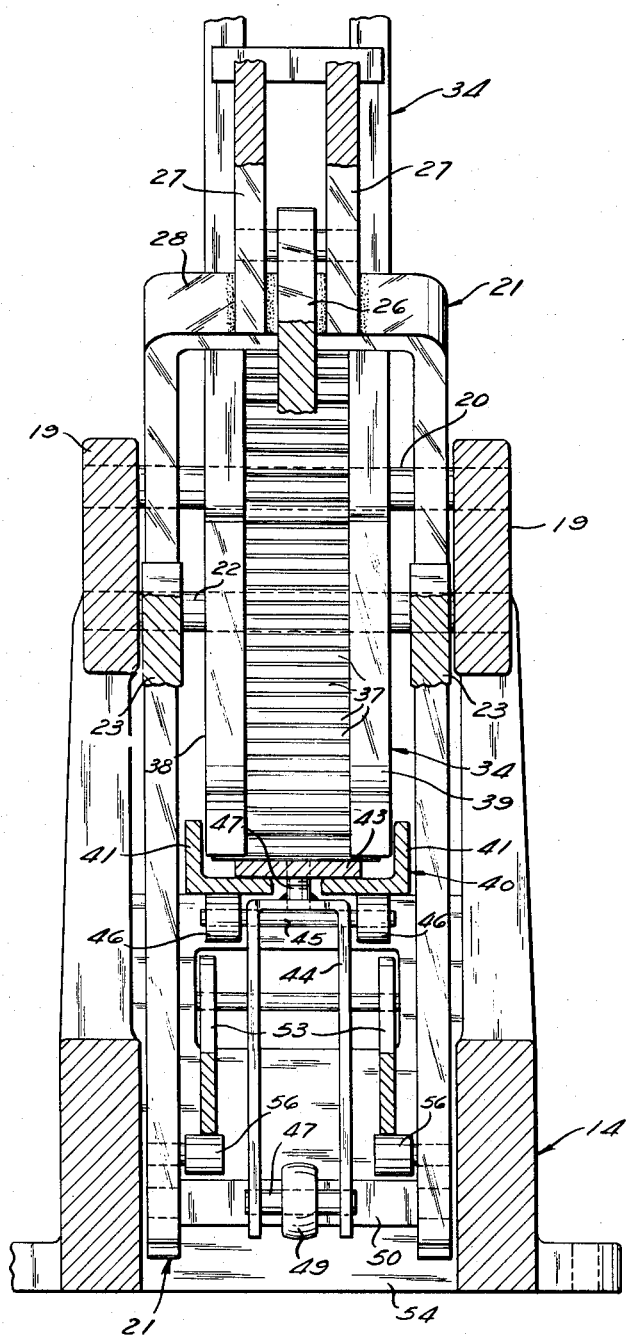
FIG. 4 is a vertical sectional view of a portion of the machine, the section being taken on a plane indicated by the line 4—4 in FIG. 2.

As the piston descends (FIG. 3), movement of the bell crank will throw the lower arms thereof rearwardly, thus retracting the plate 43. As the rollers 56 leave the cam 55, the arms 53 will fall, by gravity, thus retracting the fingers 57, as shown in FIG. 3, and further shown by dotted lines at the movement of ejection of the sleeve and wire. The spring 60 draws the fingers rearwardly into abutting engagement with the inclined rearward faces of the slots 58 in the inner end of the lower die block 42. These faces serve as stops to limit the rearward movement of the fingers 57.

As the top die 62 descends under further outward movement of the piston and actuation of the linkage, the teeth 66 in the top die will crimp the sleeve and the anvil 64 in the lower die and will deform the sleeve and the wire frame 13 therein to an extent sufficient to restrain endwise removal of the sleeve and/or separation of the joint. In practice, an air pressure of eighty pounds (80 lbs.) delivered to the cylinder assembly 18 will produce, by virtue of the arrangement of the linkage, a pressure in excess of ten thousand pounds (10,000 lbs.) on the die blocks. Thus, the joint cannot be broken unless a severe bending action is applied at right angles to a fulcrum disposed in the center of the joint.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. A machine for crimping a tubular sleeve over the free ends of a pair of coaxial rods comprising a bed, a pair of upright columns thereon, a piston cylinder assembly vertically supported by said columns, a bell crank pivoted on said columns and pivotally connected to the piston in said piston cylinder assembly, an arm pivoted between said columns, an upper die block affixed to the free end of said arm, linkage intermediate said bell crank and said arm to multiply the power exerted by said piston, a hopper adjacent said column for tubular sleeves, said hopper having a discharge throat therein, a fixed die block subjacent said upper die block, both of said die blocks having mating grooves therein for the reception of a tubular sleeve, a horizontal reciprocative plate connected to said bell crank and aligned with said discharge throat in said hopper for moving a tubular sleeve into said groove in said fixed die block, a second arm pivoted to said bed subjacent said plate, a cam thereon operatively engaged with said bell crank for raising and lowering said second arm, and fingers actuated by said arm to restrain ejection of said tube from said groove in said fixed die block when said plate is in its forward position.

2. A machine for crimping a tubular sleeve over the free ends of a pair of coaxial rods comprising a bed, a pair of upright columns thereon, a piston cylinder assembly vertically supported on said columns, a bell crank pivoted to said columns and to the piston in said piston cylinder assembly, an arm pivoted to said columns, an upper die block affixed to the free end of said arm, linkage connected to said bell crank and to said arm to multiply the thrust exerted by said piston, a hopper for said tubular sleeves adjacent said column having a discharge opening therein, a fixed die block subjacent said upper die block, both of said die blocks having aligned grooves therein for the reception of a tubular sleeve, a plate connected to said bell crank and mounted for sliding movement towards and away from said discharge opening in said hopper for moving a tubular sleeve into the groove in said fixed die block, a second arm pivoted to said bed subjacent said plate, a cam thereon engaged with said bell crank to raise and lower said second arm, and fingers connected to said second arm and movable therewith from a sleeve positioning position to a storage position and return, said fingers being adjacent the fixed die groove when in the sleeve positioning position to resist ejection of said tubular sleeve from said fixed die block when said plate is in its forward position.

3. A machine for crimping a tubular sleeve over the free ends of a pair of coaxial rods comprising a bed, an upright column thereon, a cylinder supported by said column, a piston therein, a bell crank pivoted to said piston and connected to said column, an arm pivoted on said column, an upper die block affixed to the free end thereof, linkage intermediate said bell crank and said arm to multiply the power exerted by said piston, a hopper adjacent said column having an outlet thereon for the tubular sleeves, a fixed die block subjacent said upper die block, said die blocks having confronting grooves therein, a plate connected to said bell crank for sliding towards and away from said outlet in said hopper and moving one of said tubular sleeves into said groove in said fixed die block, a second arm pivoted to said bed subjacent said plate, a cam thereon engaged by said bell crank to raise and lower said arm, fingers pivoted on the end of said second arm, said grooves each having a forward wall forming a stop in said fixed die block, and spring means urging said fingers toward said stops.

4. A machine for crimping a tubular sleeve over the free ends of a pair of coaxial rods comprising a bed, an upright column thereon, a piston cylinder assembly supported by said column, a bell crank pivotally connected to said column and to the piston in said piston cylinder assembly, a link pivoted to said bell crank, a second link pivoted thereto, a pair of turn buckles pivoted to said second link, an arm pivoted on said column, an upper die block on the free end thereof pivotally connected to said turn buckles, a hopper adjacent said column for the tubular sleeves, a fixed die block subjacent said upper die block having a groove therein for the reception of a tubular sleeve, said hopper having an opening therein adjacent said grooves, a plate mounted for sliding movement towards and away from said opening in said hopper, said plate being connected to said bell crank to move a tubular sleeve into said groove in said fixed die block, a second arm pivoted to said bed subjacent said plate, a cam thereon engaged by said bell crank to raise and lower said arm, and fingers controlled by the movement of said arm to arrest ejection of said tube from said fixed die block when said plate is in its forwardmost position.

5. A machine for closing the ends of a rectangular border wire in a bed spring comprising a rectangular table, blocks adjacent the corners thereof, shoulders adjacent the top of each of said blocks for the retention of said border wire, a press on a side of said table intermediate said blocks and adjacent the ends of said border wire, a hopper for tubular sleeves adjacent said press, a fixed lower die block and a reciprocative upper die block on said press having vertically aligned grooves therein for one of said sleeves, means for raising and lowering said upper die block, means for successively feeding one of said sleeves into said grooves in said die blocks, and ejection fingers connected to said feeding means and projectable into the space between the dies when the dies are open and the feeding means is advanced, said fingers being retracted into a storage position when the feeding means is retracted, whereby a sleeve telescopically engaged with the ends of said border wire will be crimped thereon up the downward movement of said upper die block.

6. A mechanism for uniting the ends of a bed spring frame together with a sleeve, comprising, a bed including means to support a rectangular bed spring frame, movable dies carried on a bed, power means connected to the dies to move the dies relatively to open said dies and to close said dies along an interface, and means connected to the bed to one side of the dies to shift one such sleeve toward the other side of the dies to a position between the dies each time the dies open, one of the dies having at least one guide slot, at least one finger disposed in each such slot, said one die including a stop adjacent one side of each such slot, at said one side of the dies, such finger having a sleeve locating position spaced from one such stop and projecting on both sides of said one die interface, each such finger having a storage position on the slot side of the interface and against such stop and means connecting each such finger to the power means to shift each such finger from the sleeve locating position to the storage position and return.

7. The device of claim 6 wherein the power means includes at least one arm pivotally mounted on the mechanism bed and wherein each such finger is pivotally connected to one such arm, and wherein a spring is connected to the finger to urge the finger away from said sleeve locating position and into abutment with said stop when the finger is in the storage position.

References Cited in the file of this patent
UNITED STATES PATENTS

| | | |
|---|---|---|
| 2,722,146 | Byrem | Nov. 1, 1955 |
| 2,913,014 | White | Nov. 17, 1959 |

FOREIGN PATENTS

| | | |
|---|---|---|
| 17,973 | Australia | Aug. 12, 1929 |